United States Patent
Ohtani et al.

(10) Patent No.: US 7,049,022 B2
(45) Date of Patent: May 23, 2006

(54) METAL SEPARATOR FOR FUEL CELL AND PRODUCTION METHOD THEREFOR

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 364 days.

(21) Appl. No.: 10/387,431

(22) Filed: Mar. 14, 2003

(65) Prior Publication Data

US 2003/0175576 A1  Sep. 18, 2003

(30) Foreign Application Priority Data

Mar. 14, 2002 (JP) .............................. 2002-070384

(51) Int. Cl.
*H01M 8/02* (2006.01)
*B32B 15/00* (2006.01)
*C23C 22/00* (2006.01)

(52) U.S. Cl. .................. 429/34; 428/469; 148/240; 148/500

(58) Field of Classification Search .................. 429/34, 429/35, 36, 37, 38, 39; 428/469; 148/240, 148/500
See application file for complete search history.

(56) References Cited

U.S. PATENT DOCUMENTS

| | | | | |
|---|---|---|---|---|
| 5,009,963 | A  * | 4/1991 | Ohmi et al. ............. | 428/469 X |
| 6,835,487 | B1 * | 12/2004 | Takao et al. .................. | 429/34 |
| 6,884,363 | B1 * | 4/2005 | Ohtani et al. ........... | 148/240 X |
| 2004/0253503 | A1* | 12/2004 | Ohtani et al. ................. | 429/38 |
| 2005/0089742 | A1* | 4/2005 | Ishigami et al. .............. | 429/34 |

* cited by examiner

*Primary Examiner*—Stephen J. Kalafut
(74) *Attorney, Agent, or Firm*—Arent Fox PLLC

(57) ABSTRACT

A metal separator for fuel cells and a production method for the separator balances high corrosion resistance and high performance of electric generation due to low contact resistance. In the metal separator for fuel cells, a passivation film is formed on the surface thereof and x (M$\Omega \cdot cm^2$) calculated by an equation: $(V_{H-VL})/(B-A)$ is in a range of $0.0026 \leq x \leq 0.04$, wherein in a sulfuric acid solution at 90° C. and pH 3, $V_H$ (V) is the highest voltage; $V_L$ (V) is the lowest voltage; A ($\mu A/cm^2$) is corrosion current density in power generation at the lowest voltage $V_L$; and B ($\mu A/cm^2$) is corrosion current density in power generation at the highest voltage $V_H$.

5 Claims, 2 Drawing Sheets

METAL SEPARATOR FOR FUEL CELL AND PRODUCTION METHOD THEREFOR

BACKGROUND OF THE INVENTION

1. Field of the Invention

The present invention relates to a metal separator for solid polymer electrolyte fuel cells, and relates to a production method for the separator.

2. Description of the Related Art

In a solid polymer fuel cell, a laminated body, in which a separator is laminated on both sides of a planar MEA (Membrane Electrode Assembly), is regarded as one unit, and plural units are stacked and form a fuel cell stack. The MEA is formed as a three-layer structure in which an electrolyte membrane made of, for example, an ion exchange resin or the like, is interposed between a pair of gas diffusion electrodes that constitute a cathode and an anode. In the gas diffusion electrode, a gas diffusion layer is formed outside of an electrode catalyst layer in contact with the electrolyte membrane. Furthermore, the separator is laminated so as to come into contact with the gas diffusion electrode of the MEA and a gas passage that allows a gas to flow and a coolant passage are thereby formed between the separator and the gas diffusion electrode. According to such a fuel cell, for instance, when a hydrogen gas as a fuel is caused to flow in the gas passage facing the gas diffusion electrode on the anode side and an oxidizing gas such as oxygen or air is caused to flow in the gas passage facing the gas diffusion electrode on the cathode side, an electrochemical reaction occurs, resulting in the generation of electricity.

The above separator must have a function in which electrons generated by catalytic reaction of the hydrogen gas at the anode side are supplied to an external circuit, and in addition, the electrons are supplied from the external circuit to the cathode side, and therefore, materials having conductivity are used as a material thereof. A conventional separator is made of graphite, graphite-resin composition material, etc., and the above gas passage and coolant passage are formed by cutting, molding, or the like.

In the separator, very high corrosion resistance is required since a conditions inside the fuel cell, in particular, the conditions in the above gas passage and coolant passage, etc., are humid and of low pH. The graphite type materials are superior in this respect; however, they have disadvantages in that a press-molding which is superior in productivity cannot be employed for producing the separator. Thus, currently, as a separator, a material using a stainless steel plate which can employ the press-molding and is superior in corrosion resistance, is being produced. In such separator, a stainless steel plate is rolled so as to be a thin plate, this thin plate is press-molded into a corrugated form in cross section so that grooves are formed on the upper surface and the rear surface thereof, and the above gas passages and coolant passages are thereby formed.

However, stainless steel may have defects such as pin holes in a passivation film which is formed naturally on the surface thereof in air, and corrosion originates thereat, and therefore, it cannot be said that stainless steel has sufficiently corrosion resistance, and it is necessary to further improve the corrosion resistance. In contrast, when the corrosion resistance is excessively increased, there is a problem in that contact resistance for the electrode construction increases and performance of electrical generation is reduced.

SUMMARY OF THE INVENTION

It is an object of the present invention to provide a metal separator for fuel cells which is made of stainless steel, etc., and which attempts to strike a balance between high corrosion resistance and high performance of electric generation due to low contact resistance, and to provide a production method for the separator.

A metal separator for fuel cells according to the present invention has a passivation film formed on the surface thereof and x (M$\Omega$·cm$^2$) calculated by the equation: $(V_H - V_L)/(B-A)$ is in the range of $0.0026 \leq x \leq 0.04$, wherein in a sulfuric acid solution at 90° C. and pH 3, $V_H$ (V) is the highest voltage; $V_L$ (V) is the lowest voltage; A ($\mu$A/cm$^2$) is the corrosion current density in power generation at the lowest voltage $V_L$; and B ($\mu$A/cm$^2$) is the corrosion current density in power generation at the highest voltage $V_H$.

The above x (M$\Omega$·cm$^2$) refers to electrical resistance per unit area when metal cation in metallic material dissolves into solution, and in the present invention, it is defined as corrosion resistance which indicates a degree of corrosion in a specific condition (in a sulfuric acid solution at 90° C. and pH 3). The higher the corrosion resistance, the higher the corrosion resistance under these conditions (the lower the dissolvable property of cation). Therefore, high corrosion resistance can be obtained without a passivation film having an excessive thickness by controlling x in the range of $0.0026 \leq x \leq 0.04$, and in addition, superior performance of electric generation can also be obtained by maintaining low contact resistance.

A production method for a metal separator for fuel cells according to the present invention is suitable as a method for producing the above separator of the present invention, and is characterized by comprising a first process for removing a natural oxidation layer on the surface of material made of a metal plate, a second process for removing a surface layer of base material, a third process for forming a passivation film on the surface thereof, and a fourth process for selectively removing a part of an oxide, such as iron oxide, in the passivation film.

In the above production method, an oxygen diffusion region which exists in a surface layer of a base material is removed first by removing a natural oxidation layer in a first process and then by removing the surface layer of the base material in a second process. Since the natural oxidation layer and the oxygen diffusion region which exists in the surface layer of the base metal inhibit corrosion resistance, in the present invention, first, a fresh surface of the base metal is exposed by removing these layers on the surface of the material. Next, a passivation film is formed on the fresh surface of the base material by a third process and high corrosion resistance is thereby obtained, and then a part of the oxide which exists in the passivation film is selectively removed by a fourth process and as a result, very high corrosion resistance is obtained by further improving quality of the passivation film.

In the above production method of the present invention, the first process and the second process may be carried out in one step, and the third process and the fourth process may be carried out in one step. Specifically, dissolving removal of the natural oxidation layer (first process) and dissolving removal of the surface layer of the base material (second process) can be continuously carried out by performing electrolytic etching on the material. Furthermore, after this process, formation of the passivation film (third process) and selectively dissolving removal of a part of the oxide in the passivation film (fourth process) can be continuously carried out by performing passivation process in a nitric acid bath on the material. Thus, by collectively and continuously performing the first process and the second process and the third process and the fourth process, respectively, performing each process separately is not necessary and productivity is improved.

As a metallic material in the present invention, a stainless steel plate in which conductive inclusions for forming conductive passages protrude from the surface is suitably employed, and for example, a stainless steel plate having the following composition is suitably used. That is, the stainless steel plate comprises C: 0.15 wt. % or less, Si: 0.01 to 1.5 wt. %, Mn: 0.01 to 2.5 wt. %, P: 0.035 wt. % or less, S: 0.01 wt. % or less, Al: 0.001 to 0.2 wt. %, N: 0.3 wt. % or less, Cu: 0 to 3 wt. %, Ni: 7 to 50 wt. %, Cr: 17 to 30 wt. %, Mo: 0 to 7 wt. %, and balance of Fe, B, and inevitable impurities, with contents of Cr, Mo, and B satisfying the following formula:

$$Cr(wt.\%) + 3 \times Mo(wt.\%) - 2.5 \times B(wt.\%) \leq 17$$

According to this stainless steel plate, B deposits on the surface so as to form $M_2B$ type borides, MB type borides or $M_{23}(C, B)_6$ type boron carbide, which are conductive inclusions.

DETAILED DESCRIPTION OF THE INVENTION

Figure 1:
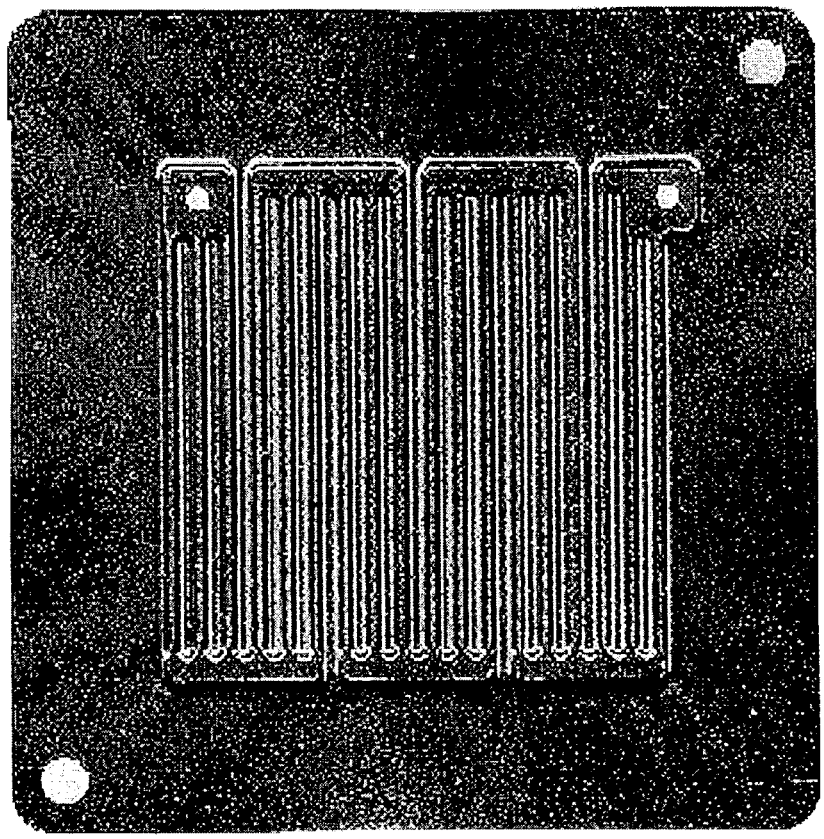
FIG. 1 is a photograph of a separator produced in Examples of the present invention.

In the following, embodiments according to the present invention will be explained.

A. Production of Separator (a) Material Plate Made of SUS316L

A stainless steel plate made of SUS316L was cold-rolled while an annealing process was properly carried out so as to form a thin plate having a thickness of 0.2 mm, and then material plates in squares of 100 mm×100 mm were cut out from this thin plate, and the desired number of material plates a was obtained.

(b) Material Plate Made of SUS316L Plated with Gold

A stainless steel plate made of SUS316L was cold-rolled while an annealing process was properly carried out so as to form a thin plate having a thickness of 0.2 mm, and then material plates in squares of 100 mm×100 mm were cut out from this thin plate. Next, these material plates were plated at a thickness of 0.1 μm with gold and the desired number of material plates b was obtained.

(c) Material Plate Made of Conductive Inclusions Deposited Stainless Steel

A stainless steel plate comprising each composition shown in Table 1 and blank of Fe and inevitable impurities was cold-rolled while an annealing process was properly carried out so as to form a thin plate having a thickness of 0.2 mm. Then, material plates in squares of 100 mm×100 mm were cut out from this thin plate, and the desired number of material plates c was obtained. In the material plates c, B was deposited on the surface so as to form $M_2B$ type borides, MB type borides or $M_{23}(C, B)_6$ type boron carbide, which are conductive inclusions.

TABLE 1

| C | Si | Mn | P | S | Cu | Ni | Cr | Mo | Nb | Ti | Al | N | B (wt. %) |
|---|----|----|---|---|----|----|----|----|----|----|----|---|---|
| 0.073 | 0.28 | 0.13 | 0.015 | 0.001 | 0.11 | 10.1 | 20.9 | 2.03 | — | — | 0.08 | 0.03 | 0.60 |

With respect to the above material plates a, b, and c, surface treatment in Process 2 was carried out by using surface treatment methods 1 to 5 shown in Table 2, respectively. The surface treatments in Process 2 are processes in which soaking is performed for a specific period in a 50 wt. % nitric acid solution bath held at 50° C., and correspond to the third process and the fourth process in the present invention, that is, the formation of a passivation film (third process) and selectively dissolving removal of a part of the oxide in the passivation film (fourth process).

TABLE 2

| Surface Treatment Method | Process | Process 2 (Soaking) | Corrosion Resistance x (MΩ · cm²) |
|---|---|---|---|
| 1 | — | in 50% HNO₃ at 50° C. for 1 min | 0.001 |
| 2 | — | in 50% HNO₃ at 50° C. for 10 min | 0.0015 |
| 3 | — | in 50% HNO₃ at 50° C. for 30 min | 0.002 |
| 4 | — | in 50% HNO₃ at 50° C. for 180 min | 0.0022 |
| 5 | — | in 50% HNO₃ at 50° C. for 600 min | 0.0024 |
| 6 | Electrolytic Etching | in 50% HNO₃ at 50° C. for 0.5 min | 0.0025 |
| 7 | Electrolytic Etching | in 50% HNO₃ at 50° C. for 1 min | *0.0026 |
| 8 | Electrolytic Etching | in 50% HNO₃ at 50° C. for 2 min | *0.0028 |
| 9 | Electrolytic Etching | in 50% HNO₃ at 50° C. for 3 min | *0.003 |
| 10 | Electrolytic Etching | in 50% HNO₃ at 50° C. for 4 min | *0.004 |
| 11 | Electrolytic Etching | in 50% HNO₃ at 50° C. for 5 min | *0.005 |
| 12 | Electrolytic Etching | in 50% HNO₃ at 50° C. for 6 min | *0.006 |
| 13 | Electrolytic Etching | in 50% HNO₃ at 50° C. for 7 min | *0.007 |
| 14 | Electrolytic Etching | in 50% HNO₃ at 50° C. for 8 min | *0.008 |
| 15 | Electrolytic Etching | in 50% HNO₃ at 50° C. for 9 min | *0.009 |
| 16 | Electrolytic Etching | in 50% HNO₃ at 50° C. for 10 min | *0.01 |
| 17 | Electrolytic Etching | in 50% HNO₃ at 50° C. for 20 min | *0.02 |
| 18 | Electrolytic Etching | in 50% HNO₃ at 50° C. for 30 min | *0.03 |
| 19 | Electrolytic Etching | in 50% HNO₃ at 50° C. for 40 min | *0.035 |
| 20 | Electrolytic Etching | in 50% HNO₃ at 50° C. for 50 min | *0.037 |
| 21 | Electrolytic Etching | in 50% HNO₃ at 50° C. for 60 min | *0.039 |
| 22 | Electrolytic Etching | in 50% HNO₃ at 50° C. for 90 min | *0.04 |
| 23 | Electrolytic Etching | in 50% HNO₃ at 50° C. for 150 min | 0.042 |
| 24 | Electrolytic Etching | in 50% HNO₃ at 50° C. for 200 min | 0.044 |
| 25 | Electrolytic Etching | in 50% HNO₃ at 50° C. for 300 min | 0.05 |
| 26 | Electrolytic Etching | in 50% HNO₃ at 50° C. for 400 min | 0.055 |
| 27 | Electrolytic Etching | in 50% HNO₃ at 50° C. for 500 min | 0.06 |
| 28 | Electrolytic Etching | in 50% HNO₃ at 50° C. for 600 min | 0.065 |

| Surface Treatment Method | SUS316L | | SUS316L Plated with Gold | | Conductive Inclusion Deposited Stainless Steel Plate | |
|---|---|---|---|---|---|---|
| | Contact Resistance (mΩ · cm²) | Ratio of Corrosion Area (%) | Contact Resistance (mΩ · cm²) | Ratio of Corrosion Area (%) | Contact Resistance (mΩ · cm²) | Ratio of Corrosion Area (%) |
| 1 | 0.2 | 57 | 0.1 | 63 | 0.1 | 47 |
| 2 | 0.2 | 56 | 0.1 | 63 | 0.1 | 47 |
| 3 | 0.2 | 56 | 0.1 | 62 | 0.1 | 45 |
| 4 | 0.2 | 53 | 0.1 | 61 | 0.1 | 43 |
| 5 | 0.2 | 42 | 0.1 | 47 | 0.1 | 33 |
| 6 | 0.2 | 24 | 0.1 | 38 | 0.2 | 16 |
| 7 | 0.3 | 0 | 0.1 | 0 | 0.2 | 0 |
| 8 | 0.3 | 0 | 0.1 | 0 | 0.2 | 0 |
| 9 | 0.3 | 0 | 0.1 | 0 | 0.2 | 0 |
| 10 | 0.3 | 0 | 0.1 | 0 | 0.3 | 0 |
| 11 | 0.3 | 0 | 0.1 | 0 | 0.3 | 0 |
| 12 | 0.4 | 0 | 0.1 | 0 | 0.3 | 0 |
| 13 | 0.4 | 0 | 0.1 | 0 | 0.3 | 0 |
| 14 | 0.4 | 0 | 0.1 | 0 | 0.3 | 0 |
| 15 | 0.4 | 0 | 0.1 | 0 | 0.3 | 0 |
| 16 | 0.4 | 0 | 0.1 | 0 | 0.3 | 0 |
| 17 | 0.5 | 0 | 0.1 | 0 | 0.3 | 0 |
| 18 | 0.5 | 0 | 0.1 | 0 | 0.3 | 0 |
| 19 | 0.5 | 0 | 0.1 | 0 | 0.3 | 0 |

TABLE 2-continued

| 20 | 0.5 | 0 | 0.1 | 0 | 0.4 | 0 |
| 21 | 0.6 | 0 | 0.1 | 0 | 0.4 | 0 |
| 22 | 0.6 | 0 | 0.1 | 0 | 0.4 | 0 |
| 23 | 6.3 | 0 | 1.8 | 0 | 4.1 | 0 |
| 24 | 6.9 | 0 | 1.8 | 0 | 4.2 | 0 |
| 25 | 9.3 | 0 | 2.7 | 0 | 5.7 | 0 |
| 26 | 9.7 | 0 | 2.8 | 0 | 5.7 | 0 |
| 27 | 9.8 | 0 | 2.9 | 0 | 5.8 | 0 |
| 28 | 10  | 0 | 3   | 0 | 6   | 0 |

*The Present Invention

Additionally, with respect to the above material plates a, b, and c, the surface treatments in Process 1 were carried out by using surface treatment methods 6 to 28 shown in Table 2, respectively, and then the above surface treatments in Process 2 were carried out. The surface treatments in Process 1 are processes in which soaking is performed for a specific period in an electroetching phosphoric acid solution (trade name: 6C016, produced by JASCO corporation) which is held at 50° C. and through which electric current passes at a current density of 0.125 A/cm², and correspond to the first process and the second process in the present invention, that is, dissolving removal of a natural oxidation layer (first process) and dissolving removal of a surface layer of base material (second process).

The material plates a, b, and c on which the surface treatment methods 1 to 28 shown in Table 2 were carried out as described above, were press-molded into a desired separator shape, and 84 kinds of separator in which surface characteristics of the material plates and surface treatment were made to differ, respectively, were thereby formed. FIG. 1 shows a separator after press-molding which was produced in the Examples, and the separator has a power generation portion in a corrugated form in cross section at the center and has a flat margin therearound.

B. Measurement of Corrosion Resistance

Test pieces of 50 mm×20 mm were cut out from the power generation portion of each separator produced as described above, and with respect to these test pieces, corrosion resistance x (MΩ·cm²) was obtained as follows. First, effective measuring area of the test piece was made to be 1 cm² by masking a part at an edge and surface thereof, and with respect to the test pieces, A (μA/cm²), which is corrosion current density in power generation at the lowest voltage $V_L$ (V) and B (μA/cm²), which is corrosion current density in power generation at the highest voltage $V_H$ (V) were measured in sulfuric acid solution at 90° C. and pH 3. Then, the measured values were applied to the next equation and the corrosion resistance x was thereby calculated.

$$x(M\Omega \cdot cm^2) = (V_H - V_L)/(B - A)$$

In this case, the lowest voltage $V_L$ was set to be 0.5 V and the highest voltage $V_H$ was set to be 0.9 V The calculated corrosion resistances x (MΩ·cm²) are shown in Table 2.

C. Measurement of Contact Resistance and Ratio of Corrosion Area after Power Generation Contact resistance (MΩ·cm²) was measured in the state in which two of the same kind of separator were brought into contact with each other at a surface pressure of 5 kg/cm², using each separator produced as described above. In addition, using each separator produced as described above, one fuel cell unit was formed by laminating the separators on both sides of a membrane electrode assembly (MEA), and the unit was generated and ratio of corrosion area in the power generation portion of the separator was measured after 1000 hours of power generation. The ratio of corrosion area was measured by the following method. Since when corrosion occurs at a power generation portion of a separator having metallic luster the corroded portion loses metallic luster and turns brown, a photograph of the power generation portion was taken and the area ratio of the corrosion portion (changed color portion) to the entire area of the power generation portion was measured. The measured values are shown in Table 2.

Figure 2:
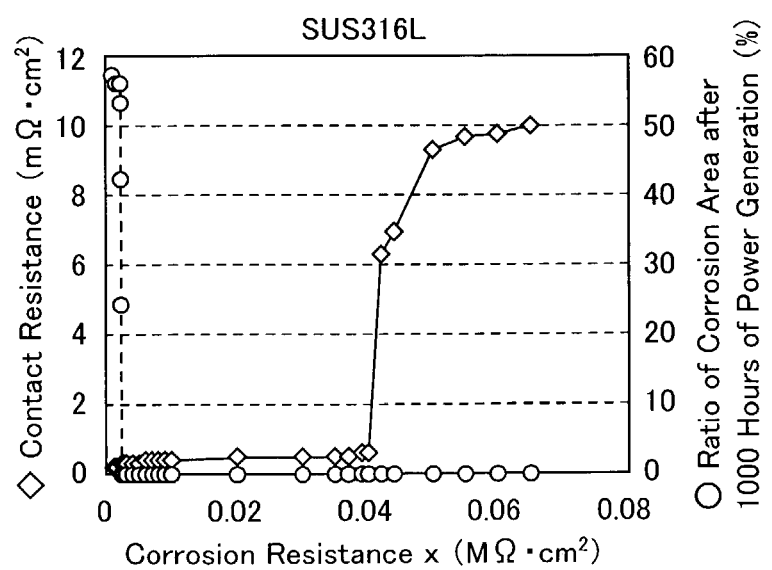
FIG. 2 is a diagram showing the relationship between the corrosion resistance and the contact resistance and area ratio of corrosion in a separator using material made of SUS316L.
Figure 3:
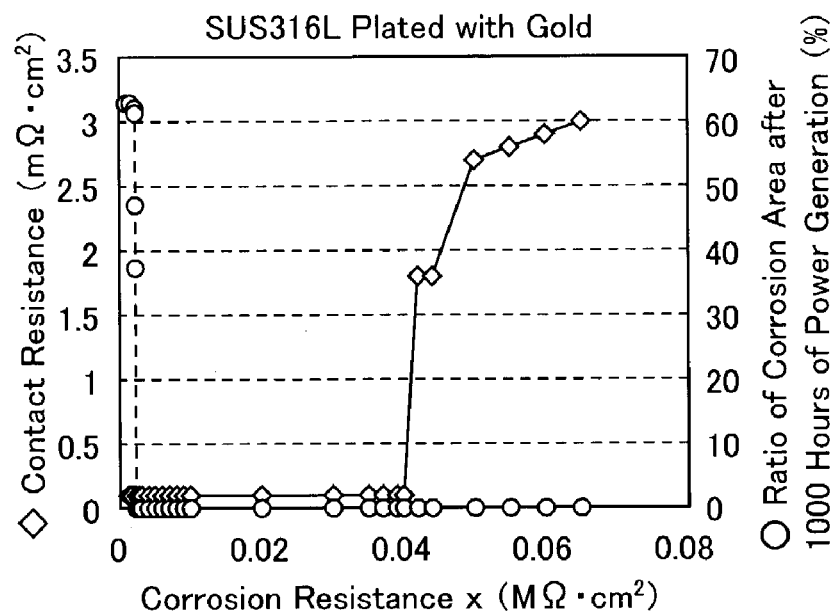
FIG. 3 is a diagram showing the relationship between the corrosion resistance and the contact resistance and area ratio of corrosion in a separator using material made of SUS316L plated with gold.
Figure 4:
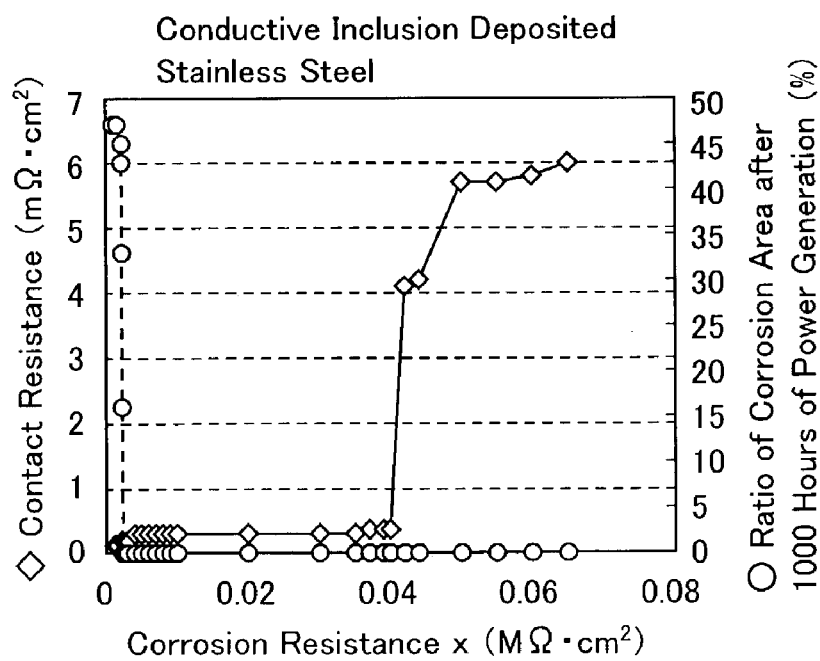
FIG. 4 is a diagram showing the relationship between the corrosion resistance and the contact resistance and area ratio of corrosion in a separator using material made of conductive inclusions deposited stainless steel.

With respect to 3 kinds of the material plate, that is, SUS316L, SUS316L plated with gold, and stainless steel in which conductive inclusions were deposited, the relationship between the corrosion resistance and the contact resistance or the area ratio of corrosion was examined. The results are shown in FIGS. 2 to 4. As is apparent from these figures, when the corrosion resistance is 0.04 (MΩ·cm²) or less, the contact resistance is very low, and in contrast, when the corrosion resistance exceeds 0.04 (MΩ·cm²), the contact resistance rapidly increases, and it is shown that the passivation film is too thick. Additionally, when the corrosion resistance is 0.0026 (MΩ·cm²) or more, the ratio of corrosion area is 0, and in contrast, when the corrosion resistance is under 0.0026 (MΩ·cm²), the ratio of corrosion area rapidly increases. Therefore, it was confirmed that a separator in which the contact resistance is low and the ratio of corrosion area is low is obtained when the corrosion resistance x (MΩ·cm²) satisfies the equation: $0.0026 \leq x \leq 0.04$.

What is claimed is:

1. A metal separator for fuel cells comprising a passivation film formed on the surface thereof, wherein the passivation film has a corrosion resistance x (MΩ·cm²) calculated by an equation: $(V_H - V_L)/(B - A)$ is in the range of $0.0026 \leq x \leq 0.04$, wherein in a sulfuric acid solution at 90° C. and pH 3, $V_H$ (V) is the highest voltage; $V_L$ (V) is the lowest voltage, A ($\mu A/cm^2$) is corrosion current density in power generation at the lowest voltage $V_L$; and B ($\mu A/cm^2$) is corrosion current density in power generation at the highest voltage $V_H$.

2. A method for producing a metal separator for fuel cells, which comprises a passivation film formed on the surface thereof and the passivation film has a corrosion resistance x ($M\Omega \cdot cm^2$) calculated by an equation: $(V_H-V_L)/(B-A)$ is in the range of $0.0026 \leq x \leq 0.04$, wherein in a sulfuric acid solution at 90° C. and pH 3, $V_H$ (V) is the highest voltage; $V_L$ (V) is the lowest voltage, A ($\mu A/cm^2$) is corrosion current density in power generation at the lowest voltage $V_L$; and B ($\mu A/cm^2$) is corrosion current density in power generation at the highest voltage $V_H$, comprising:

a first process for removing a natural oxidation layer on the surface of material made of a metal plate;

a second process for removing a surface layer of base material;

a third process for forming a passivation film on the surface of the base material; and a fourth process for selectively removing a part of an oxide from the passivation film.

3. A method for producing the metal separator for fuel cells in accordance with claim 2, wherein the first process and the second process are carried out in one step.

4. A method for producing the metal separator for fuel cells in accordance with claim 2, wherein the third process and the fourth process are carried out in one step.

5. A method for producing the metal separator for fuel cells in accordance with claim 3, wherein the third process and the fourth process are carried out in one step.

* * * * *